(12) United States Patent
King (10) Patent No.: US 10,417,188 B2
(45) Date of Patent: Sep. 17, 2019

(54) METHOD AND SYSTEM FOR TRANSFERRING TRUST ACROSS BLOCK CHAIN SEGMENTS

(71) Applicant: MasterCard International Incorporated, Purchase, NY (US)

(72) Inventor: David J. King, Guildford (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 430 days.

(21) Appl. No.: 15/166,411

(22) Filed: May 27, 2016

(65) Prior Publication Data

US 2017/0344580 A1    Nov. 30, 2017

(51) Int. Cl.
*G06F 16/174* (2019.01)
*G06F 16/13* (2019.01)
*H04L 9/32* (2006.01)

(52) U.S. Cl.
CPC ........ *G06F 16/1752* (2019.01); *G06F 16/137* (2019.01); *H04L 9/3239* (2013.01); *H04L 9/3247* (2013.01); *H04L 2209/38* (2013.01)

(58) Field of Classification Search
CPC ........ G06F 17/30067; G06F 17/30595; H03M 7/39
USPC .................. 707/693; 713/178, 161
See application file for complete search history.

(56) References Cited

U.S. PATENT DOCUMENTS

| 7,188,250 | B1 * | 3/2007 | Alfieri | ...................... H04L 9/06 713/161 |
| 9,635,000 | B1 * | 4/2017 | Muftic | ................ H04L 63/0435 |
| 2016/0028552 | A1 * | 1/2016 | Spanos | ................ H04L 9/3297 713/178 |
| 2017/0046651 | A1 * | 2/2017 | Lin | ..................... G06Q 20/0655 |

(Continued)

FOREIGN PATENT DOCUMENTS

WO    2016015041 A1    1/2016

OTHER PUBLICATIONS

International Search Report and Written Opinion issued by the International Search Authority dated Jun. 9, 2017 in corresponding PCT Application No. PCT/US2017/024916 (14 pages).

(Continued)

*Primary Examiner* — Amresh Singh
(74) *Attorney, Agent, or Firm* — Buchanan Ingersoll & Rooney PC (57) ABSTRACT

A method for generating a segmented blockchain includes: storing a first blockchain, the blockchain being comprised of blocks including a recent block, the recent block including a corresponding block header and transaction values; generating a recent hash value via hashing the corresponding block header; writing a terminal block to the first blockchain, the terminal block including a terminal block header comprised of the recent hash value, an activated terminal flag, and a forward reference identifier; generating a terminal hash value via hashing the terminal block header; generating a second blockchain, the second blockchain being comprised of a starting block, the starting blocking including a (Continued)

starting block header comprised of the terminal hash value and an activated starting flag; and transmitting the terminal block and the second blockchain to one or more computing devices associated with the first blockchain.

20 Claims, 5 Drawing Sheets

(56) References Cited

U.S. PATENT DOCUMENTS

2017/0054611 A1* 2/2017 Tiell .................. G06F 17/30598
2017/0228731 A1* 8/2017 Sheng .................. G06Q 20/401
2017/0323392 A1* 11/2017 Kasper .................. G06Q 40/12

OTHER PUBLICATIONS

Satoshi Nakamoto, "Bitcoin: A Peer-to-Peer Electronic Cash System", Dated Oct. 31, 2008, XP055131503, Retrieved from Internet: URL:https://bitcoin.org/bitcoin.pdf [retrieved on Jul. 24, 2014] the whole document (9 pages).
U.S. Appl. No. 14/976,331, entitled "Method and System Blockchain Variant Using Digital Signatures," filed Dec. 21, 2015, by David J. King.

* cited by examiner

METHOD AND SYSTEM FOR TRANSFERRING TRUST ACROSS BLOCK CHAIN SEGMENTS

FIELD

The present disclosure relates to the generation of a segmented blockchain, specifically the inclusion and use of flags in block headers in a blockchain for the segmentation of the blockchain into multiple segments to maintain trust while enabling variance in the size and formatting of the blockchain segments.

BACKGROUND

Blockchains have been developed to provide a decentralized, distributed database to record electronic transactions. In many cases, blockchains have been used for transactions using a digitally-based, virtual, cryptographic currency. In other cases, a blockchain may be used to simply record data at various times, such as for the confirmation and timestamp of files. In any instance, a blockchain is generally comprised of blocks, where each block includes a header and a series of transaction records. Due to the decentralized nature of blockchains, each block in a blockchain is often formatted with a specific format and subject to a specific file size, to ensure consistency throughout the blockchain.

However, there may be instances where the format of a blockchain may need to be changed. For example, there may be a need to include new data in block headers moving forward or allow for a larger file size for the block headers or transaction records, such as to accommodate for an increase in volume or utility in the blockchain. Traditionally, such a need would necessitate the generation of a brand new blockchain. However, the start of a new blockchain would break the trust and verifiable nature of the blockchain that is developed via the consensus mechanisms and recursive references used therein. In such cases, the old blockchain would have to be recreated in the new blockchain, with each block independently recreated and verified, in order, until every block has been verified. Such a process would be extremely time consuming and computationally intensive, with the blockchain being entirely unavailable for the addition and confirmation of new transactions in the process.

Thus, there is a need for a technological solution to enable the segmentation of a blockchain into multiple segments, where each segment may be subject to different formatting rules, without breaking the trust of the blockchain across the segments. Such a solution may thus solve the problems of existing blockchain networks by allowing for changes in format without necessitating recreation of the entire blockchain.

SUMMARY

The present disclosure provides a description of systems and methods for generation of a segmented blockchain. The use of special terminal and starting blocks may enable a new segment to be created for a blockchain that is subject to different formatting rules, while maintaining the trust across both segments of the blockchain. As a result, a blockchain may be continued indefinitely through multiple formatting changes without interruption to the blockchain and without requiring the recreation of any existing blocks.

A method for generating a segmented blockchain includes: storing, in a memory of a processing server, a first blockchain, wherein the first blockchain is comprised of a plurality of blocks including a recent block, the recent block including a corresponding block header and one or more transaction values; receiving, by a receiving device of the processing server, a request for segmentation, wherein the request for segmentation specifies the first blockchain; generating, by a hashing module of the processing server, a recent hash value via application of a predefined hashing algorithm to the corresponding block header included in the recent block included in the first blockchain; writing, by a querying module of the processing server, a terminal block to the first blockchain, wherein the terminal block includes at least a terminal block header comprised of at least the recent hash value, an activated terminal flag, and a forward reference identifier; generating, by the hashing module of the processing server, a terminal hash value via application of the predefined hashing algorithm to the terminal block header; generating, by a generation module of the processing server, a second blockchain, wherein the second blockchain is comprised of a starting block, the starting blocking including at least a starting block header comprised of at least the terminal hash value and an activated starting flag; and electronically transmitting, by a transmitting device of the processing server, at least the terminal block and the second blockchain to one or more computing devices associated with the first blockchain.

A system for generating a segmented blockchain includes: a generation module of a processing server; a transmitting device of the processing server; a memory of the processing server configured to store a first blockchain, wherein the first blockchain is comprised of a plurality of blocks including a recent block, the recent block including a corresponding block header and one or more transaction values; a receiving device of the processing server configured to receive a request for segmentation, wherein the request for segmentation specifies the first blockchain; a hashing module of the processing server configured to generate a recent hash value via application of a predefined hashing algorithm to the corresponding block header included in the recent block included in the first blockchain; and a querying module of the processing server configured to write a terminal block to the first blockchain, wherein the terminal block includes at least a terminal block header comprised of at least the recent hash value, an activated terminal flag, and a forward reference identifier. The hashing module of the processing server is further configured to generate a terminal hash value via application of the predefined hashing algorithm to the terminal block header. The generation module of the processing server is configured to generate a second blockchain, wherein the second blockchain is comprised of a starting block, the starting blocking including at least a starting block header comprised of at least the terminal hash value and an activated starting flag. The transmitting device of the processing server is configured to electronically transmit at least the terminal block and the second blockchain to one or more computing devices associated with the first blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a permissionless, distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency. In some cases, participation in a blockchain (e.g., as a node submitting and/or confirming transactions) may be permissionless (e.g., not moderated or restricted). In other cases, a blockchain may be a permissioned blockchain where only authorized computing devices may operate as nodes, where a level of participation may be based on permissions associated therewith.

System for Generation of a Segmented Blockchain

Figure 1:
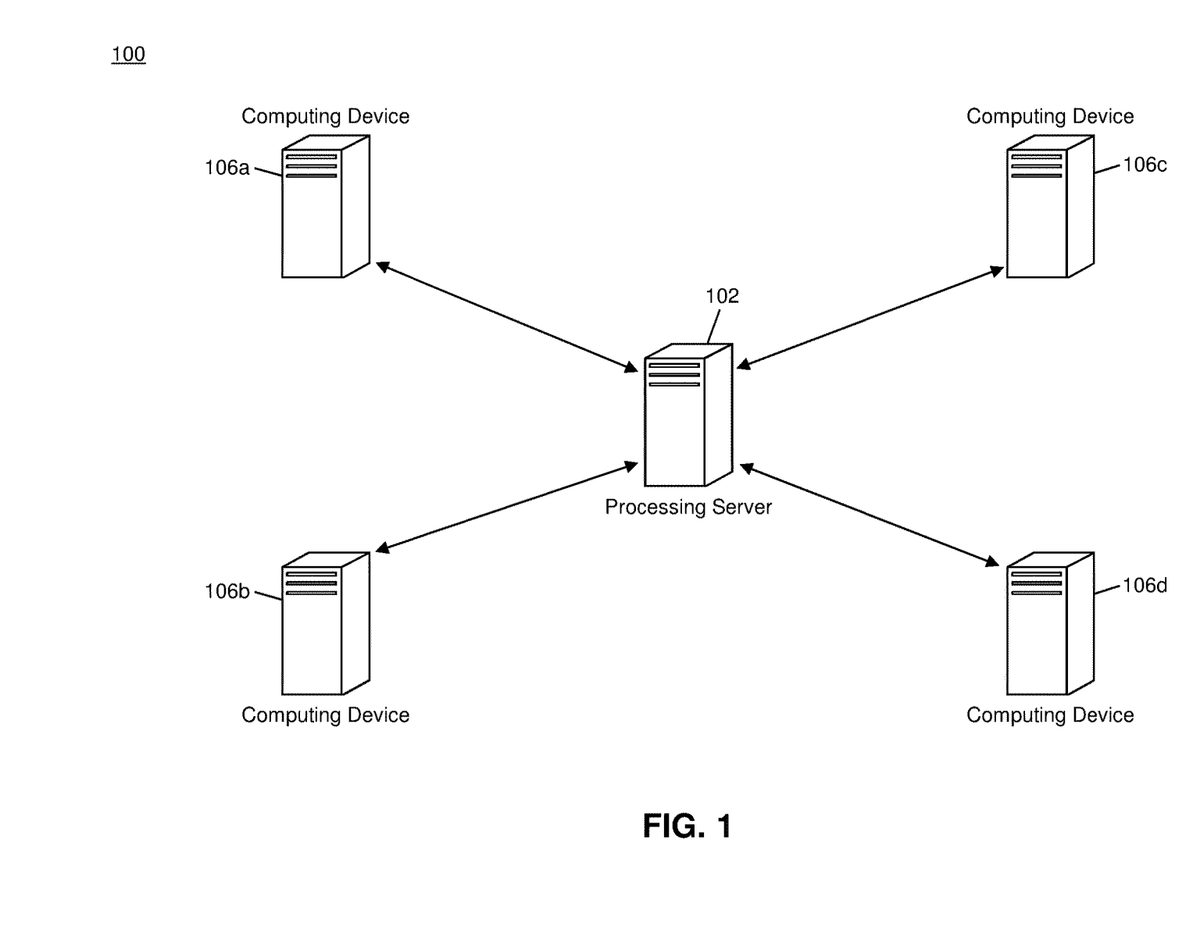
FIG. 1 is a block diagram illustrating a high level system architecture for generating a segmented blockchain in accordance with exemplary embodiments.

FIG. 1 illustrates a system 100 for the generation of a segmented blockchain.

The system 100 may include a processing server 102. The processing server 102, discussed in more detail below, may be configured to segment a blockchain to create a segmented blockchain, which may be used to modify the formatting of blocks in the blockchain or otherwise create two or more segmentations in a blockchain. In some embodiments, the processing server 102 may be a node in the blockchain network, such as may be configured to perform traditional functions of nodes in the blockchain network, such as transaction and block consensus. In other embodiments, the processing server 102 may be a computing device separately associated with the blockchain network and configured to perform the functions discussed herein. In some cases, the blockchain network may be a permissioned blockchain. In some instances, the blockchain network may use digital signatures to sign blocks and/or data included therein that is added to the blockchain, as discussed in more detail below. In such instances, the processing server 102 may be a domain authority in the blockchain network.

The system 100 may also include a plurality of computing devices 106, such as the computing devices 106a, 106b, 106c, and 106d illustrated in FIG. 1. Each computing device 106 may be a node in the blockchain network, and may be configured to perform the traditional functions of a node, such as the addition and confirmation of transactions, the generation and confirmation of blocks, the writing of blocks to the blockchain, etc. In some embodiments, one or more of the computing devices 106 in the blockchain network may also be configured to perform the functions of the processing server 102 discussed herein for the segmentation of the blockchain.

The blockchain associated with the blockchain network of the system 100 may be comprised of a plurality of blocks. Each block may include at least a block header and one or more transaction values. The block header in a block may include at least a reference to an earlier block in the blockchain, a reference to the transaction values included in the block, a terminal flag, and a starting flag. The block header may also include additional data, such as may be dependent on the implementation and/or formatting of the blockchain, such as sequence pairs in a partitioned blockchain, a network identifier, a version identifier, a nonce, a digital signature, etc.

The reference to an earlier block may be a hash of the block header in an earlier block, which may be used to indicate an ordering of the blocks in the blockchain, which may be used in the tracking and verification of transactions and other data. The hash value may be generated via the application of one or more hashing algorithms to the block header of the earlier block, with the resulting value being included in the new block header. As the new block header is subsequently hashed for inclusion in a subsequent block header, and so on, the blocks in the blockchain thus have a specific order. The reference to the one or more transaction values included in the block may similarly be a hash value of the transaction values. In exemplary embodiments, the hash value may be a merkle root of the one or more transaction values, which may be the root node in a merkle tree generated for the transaction values via one or more hashing algorithms. In some instances, the transaction values may be ordered using a suitable ordering method prior to generation of the merkle root.

The terminal flag may be a flag that indicates if the block is a terminal block. A terminal block may be the last block in a blockchain segment, where the terminal flag may be activated to indicate that the block signifies the end of the blockchain segment. The starting flag may be a flag that indicates if the block is a starting block. A starting block may be the first block in a blockchain segment, where the starting flag may be activated to indicate that the block signifies the start of a blockchain segment.

In some embodiments, the terminal block may include additional data in its block header. Such additional data may include, for example, a forward reference identifier. The forward reference identifier may be a reference to the starting block that is to start the next blockchain segment in the blockchain. In some instances, the forward reference identifier may be a hash value of a portion of the header of the start block, such as a hash value of the data in the header of the start block aside from the reference to the prior block (e.g., the terminal block), since the reference would be not be available until the terminal block header is completed. In other instances, the forward reference identifier may be a random or pseudo-random number or other value that may be used as a reference. In some embodiments, the starting block may also, or alternatively, include additional data in its block header. Such additional data may include, for instance, the forward reference identifier.

In some cases, the terminal block and starting block may not include any transaction values. In such a case, the forward reference identifier may be included in the block header in place of the reference to transaction values. In other cases, the terminal block may include transaction values, whereas the starting block may not include any transaction values. In yet other cases, both the terminal block and the starting block may include transaction values.

To initiate the segmentation of the blockchain, the processing server 102 may receive a request for segmentation. In some instances, the request for segmentation may be received from a computing device 106 in the blockchain network, from another system associated with the blockchain network, from an input device of the processing server 102, or from another suitable requesting entity or source. The request for segmentation may indicate the blockchain for which segmentation is requested. In some instances, the request for segmentation may also include one or more formatting rules for formatting of the new segment of the blockchain, such as the types and formatting of data included in block headers, formatting of transaction values, maximum file size for the transaction values, overall size for blocks, etc.

The processing server 102 may receive the request for segmentation and may initiate the segmenting of the indicated blockchain. The processing server 102 may generate the reference of the block header in the block most recently added to the blockchain via the application of one or more predetermined hashing algorithms to the block header. The processing server 102 may also generate, if applicable, a forward reference identifier. The processing server 102 may generate the block header for the terminal block, which may include the reference to the earlier block, the forward reference identifier, and an activated terminal flag. In some embodiments, the processing server 102 may also generate a merkle root for unconfirmed transactions, which may also be included in the block header for the terminal block. The processing server 102 may generate the terminal block, which includes the block header, and, if unconfirmed transactions are to be included, the transaction values for the unconfirmed transactions. The terminal block may be written to the blockchain, which may indicate the end of a blockchain segment.

The processing server 102 may then start generation of a block header for the starting block of the new blockchain segment. The starting block may include at least a reference to the header of the terminal block, the forward reference identifier, if applicable, and an activated starting flag. The reference to the header of the terminal block may be a hash value of the header generated via application of the one or more predetermined hashing algorithms to the header of the terminal block. In some instances, the processing server 102 may also generate a merkle root for any unconfirmed transactions not included in the terminal block, which may be included in the new block header. The processing server 102 may generate the starting block for the new blockchain segment, which may include the new block header, and, if applicable, transaction values for any unconfirmed transactions. In embodiments where the request for segmentation includes formatting rules for the new blockchain segment, the processing server 102 may format the block header and/or starting block and/or data included therein based on the formatting rules.

The processing server 102 may then electronically transmit the terminal block and the starting block to each of the computing devices 106 connected thereto for propagation throughout the blockchain network. The flags in the headers for each of the respective blocks may indicate to each of the computing devices 106 that the terminal block ends a blockchain segment for the blockchain and that the starting block is used as the first block in a new blockchain segment. In some instances, the processing server 102 may electronically transmit the formatting rules used in generation of the starting block. In other instances, each computing device 106 may identify the formatting rules based on the formatting of the starting block.

In some embodiments, the blockchain may be a permissioned blockchain, such as may utilize a domain authority or signing authority to digitally sign blocks added to the blockchain. Additional information regarding permissioned blockchains that utilize digital signatures for blocks is discussed in U.S. patent application Ser. No. 14/976,331, entitled "Method and System Blockchain Variant Using Digital Signatures," filed Dec. 21, 2015, by David J. King, which is herein incorporated by reference in its entirety. In such embodiments, a domain authority may be configured to digitally sign the terminal block and starting block using a private key. In such cases, the processing server 102 may be a domain authority for the blockchain network, or may electronically transmit the generated terminal block and starting block to a domain authority for signing. In latter cases, the processing server 102 may sign the terminal block and starting block using its own private key, which may be verified by the domain authority and re-signed and/or written to the blockchain and propagated to nodes in the blockchain network.

In embodiments where the processing server 102 may be configured to digitally sign terminal and starting blocks, the processing server 102 may use a private key. The private key may be part of a key pair where the corresponding public key may be electronically transmitted to the computing devices 106 for use in verification of the digital signatures, such as to ensure authenticity of the terminal and starting blocks. The private key may be stored locally in the processing server 102 and used thereby in the digital signing of the terminal and starting blocks. In some instances, the processing server 102 may be configured to generate the key pair.

The methods and systems discussed herein provide for the generation of a segmented blockchain. The processing server 102, via the activation and deactivation of flags in block headers and the use of reference values that refer to earlier and/or later blocks in the blockchain segments, may generate a terminal block to signify the end of a blockchain segment and a starting block to signify the start of a new blockchain segment, to segment a blockchain into at least two segments. The separation of the blockchain may enable the use of different formatting rules, such as the inclusion of new or alternative data types, formats, and sizes, as well as modifications to file sizes, transaction values, etc., without modifying the existing blockchain. As such, a blockchain may be segmented to accommodate for an increased file size, such as due to an increase in transaction activity, without having to recreate, replace, or modify the existing, confirmed blocks. As a result, the new formatting rules may be implemented and, due to the references, trust of the existing blockchain maintained as new blocks are added. Such a process may be used to repeatedly segment a blockchain perpetually, maintaining trust throughout the life of the blockchain and any new segment.

Processing Server

Figure 2:
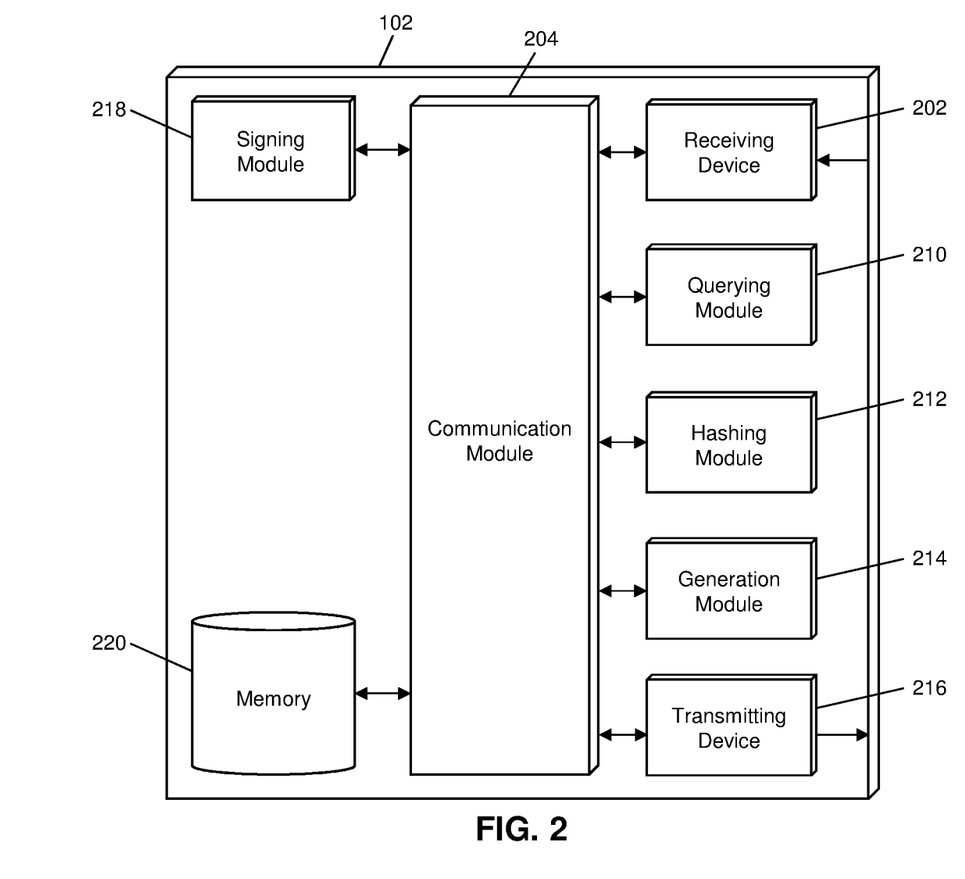
FIG. 2 is a block diagram illustrating the processing server of FIG. 1 for the generation of a segmented blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing system 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. The receiving device 202 may be configured to receive data from computing devices 104 and other devices and systems via suitable communication networks and corresponding network protocols. In some embodiments, the receiving device 202 may be comprised of multiple devices, such as different receiving devices for receiving data over different networks, such as a first receiving device for receiving data over a local area network and a second receiving device for receiving data via a blockchain network. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 106, which may be superimposed or otherwise encoded with data associated with the blockchain network, such as transactions or new blocks for addition to the blockchain. The receiving device 202 may also be configured to receive data signals electronically transmitted by computing devices 106 or other nodes in the blockchain network, or by input devices interfaced with the processing server 102, that are superimposed or otherwise encoded with requests for segmentation. Requests for segmentation may include at least an indication of the blockchain to be segmented, and may also include additional data for the segmentation, such as formatting rules for formatting of the blocks, block headers, or data included therein in the new segment.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, hashing module 212, generation module 214, signing module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a querying module 210. The querying module 210 may be configured to execute queries on databases to identify information. The querying module 210 may receive one or more data values or query strings, and may execute a query string based thereon on an indicated database, such as the subnet database 206, to identify information stored therein. The querying module 210 may then output the identified information to an appropriate engine or module of the processing server 102 as necessary. The querying module 210 may, for example, execute a query on a memory 220 of the processing server 102 to identify a blockchain for segmentation or to identify the most recently added block in a blockchain for use in generating a reference value for a new block header to be generated.

The processing server 102 may also include a hashing module 212. The hashing module 212 may be configured to generate hash values via the application of one or more hashing algorithms to data supplied to the hashing module 212. The hashing module 212 may receive data to be hashed as input, may apply one or more hashing algorithms to the data, and may output the generated hash value to another module or engine of the processing server 102. In some cases, the hashing module 212 may be supplied with the hashing algorithm(s) to be used in generation a hash value. In other cases, the hashing module 212 may identify the hashing algorithm(s) to be used, such as via the generation of queries for execution by the querying module 210 on the memory 220. The hashing module 212 may be configured, for example, to generate hash values of block headers to be used as a reference to a prior block, to generate merkle roots of transaction values for inclusion in a block header of a block, and for the generation of hash values for use as forward reference identifiers.

The processing server 102 may also include a generation module 214. The generation module 214 may be configured to generate new block headers and new blocks for use in performing the functions of the processing server 102 as discussed herein. The generation module 214 may receive a request, may generate data based on that request, and may output the generated data to another module or engine of the processing server 102. For example, the generation module 212 may be instructed to generate a terminal block and starting block for the segmentation of a blockchain. The generation module 212 may generate the block headers for the new blocks and generate the new blocks themselves for writing to the blockchain for the segmentation thereof. In some embodiments, the generation module 212 may also be configured to generate forward reference identifiers. The generation module 212 may also be configured to generate blocks and/or data included therein based on formatting rules, such as may be stored in the memory 220 of the processing server 102, included in a request for segmentation, etc.

The processing server 102 may also include a transmitting device 216. The transmitting device 216 may be configured to transmit data over one or more networks via one or more network protocols. The transmitting device 216 may be configured to transmit data computing devices 104, and other entities via suitable communication networks and corresponding network protocols. In some embodiments, the transmitting device 216 may be comprised of multiple devices, such as different transmitting devices for transmitting data over different networks, such as a first transmitting device for transmitting data over a local area network and a second transmitting device for transmitting data via a blockchain network. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals to computing devices 106 and other nodes in the blockchain network that are superimposed or otherwise encoded with terminal and starting blocks for addition to a blockchain for segmentation thereof. In some instances, the transmitting device 216 may also be configured to electronically transmit data signals superimposed with formatting rules for use by computing devices 106 and other nodes for formatting of blocks and data included therein for a new segment of the blockchain. In some embodiments, the transmitting device 216 may be configured to electronically transmit data signals superimposed or otherwise encoded with a public key used for verification of digital signatures generated by the processing server 102.

In some embodiments, the processing server 102 may also include a signing module 218. The signing module 218 may receive data to be signed as input, may digitally sign the data, and may output the signed data to another module or engine of the processing server 102. In some instances, the signing module 218 may digitally sign data using a private key associated with the processing server 102. In such instances, the signing module 218 may receive the private key as input, or may identify the private key, such as by instructing the query module 210 to identify the private key in the memory 220 of the processing server 102. The signing module 218 may be configured to digitally sign terminal blocks and starting blocks generated by the generation module 214 of the processing server 102 prior to being written to the blockchain. In some embodiments, the signing module 218 may also be configured to verify digital signatures of blocks or other data for inclusion in the blockchain, such as those may be generated by computing devices 106 or other nodes in the blockchain network, using public keys associated with the respective node.

The processing server 102 may also include a memory 220. The memory 220 may be configured to store data for use by the processing server 102 in performing the functions discussed herein, such as a private key, key pair, formatting rules, a blockchain, etc. The memory 220 may be configured to store data using suitable data formatting methods and schema and may be any suitable type of memory, such as read-only memory, random access memory, etc. The memory 220 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 220 may be comprised of or may otherwise include a relational database that utilizes structured query language for the storage, identification, modifying, updating, accessing, etc. of structured data sets stored therein.

Process for Segmentation of a Blockchain

Figure 3:
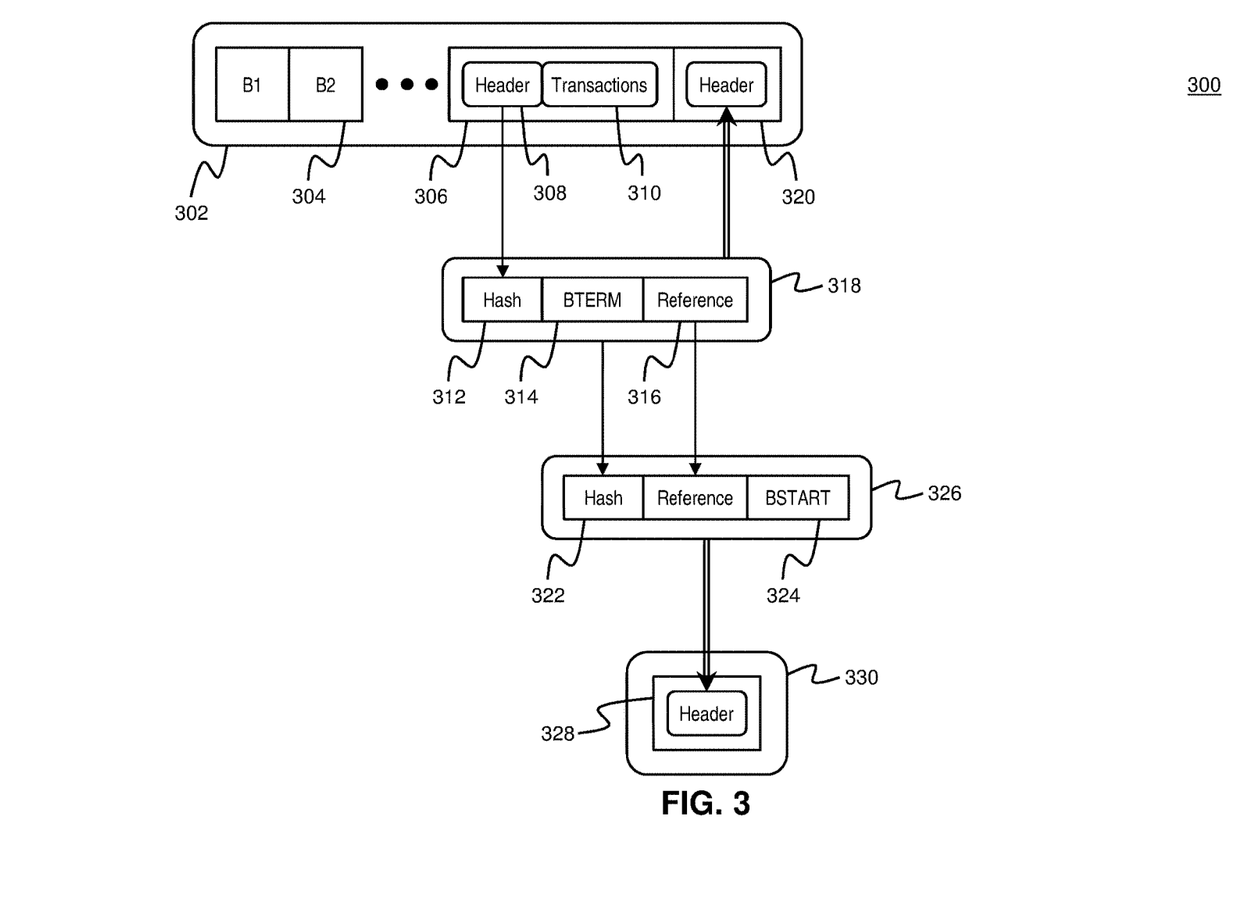
FIG. 3 is a flow diagram illustrating a process for the generation of a segmented blockchain via terminal and start blocks in accordance with exemplary embodiments.

FIG. 3 illustrates a process 300 for the segmentation of a blockchain for the generation of a segmented blockchain where segments may utilize different formatting rules while transferring trust generated by the blockchain across segments.

In the process 300, the processing server 102 may be requested to generate a new segment for a first blockchain segment 302. The first blockchain segment 302 may comprise an entire blockchain, or may be a segment of a blockchain, such as previously generated using the process 300. The first blockchain segment 302 may be comprised of a plurality of blocks 304. The plurality of blocks 304 may include a most recent block 306. The most recent block 306 may include at least a block header 308 and a plurality of transactions 310. The most recent block 306 may be the block most recently added to the first blockchain segment 302, as may be identified by a timestamp included in the header 308 or by the lack of inclusion of a reference to the most recent block 306 or its block header 308.

The hashing module 212 of the processing server 102 may generate a hash 312 of the header 308 of the most recent block 306. The hash 312 may be generated via the application of one or more hashing algorithms to the header 308. The generation module 214 of the processing server 102 may generate a terminal block header 318 that includes the hash 312. The terminal block header 318 may also include an activated terminal flag 314. The activated terminal flag 314, illustrated in FIG. 3 as the flag BTERM, may be activated to indicate that the block that includes the terminal block header 318 is a terminal block. The terminal block header 318 may also include a reference identifier 316. The reference identifier 316 may be a value generated by the generation module 214 or hashing module 212 of the processing server 102.

The generation module 214 may generate the terminal block header 318 with the hash 312, activated terminal flag 314, and reference identifier 316, and may generate a terminal block 320 that includes the terminal block header 318. The generation module 214, or another suitable module or engine of the processing server 102, may write the terminal block 320 to the first blockchain segment 302. The terminal block 320, with the terminal block header 318 having the activated terminal flag 314, may indicate to any node in the blockchain network that the first blockchain segment 302 ends at the terminal block 320.

For generation of the corresponding starting block, the hashing module 212 of the processing server 102 may generate a hash 322 of the terminal block header 318. The hash 322 may be generated via the application of one or more hashing algorithms to the terminal block header 318. In some instances, the hash 322 may be generated using the same one or more hashing algorithms used to generate the hash 312. The generation module 214 may generate the starting block header 326 for use in the starting block, which may include the hash 322, the reference identifier 316, and an activated starting flag 324. The activated starting flag 324, illustrated in FIG. 3 as the flag BSTART, may indicate that the block that includes the starting block header 326 is the starting block for a new blockchain segment.

The generation module 214 may then generate a starting block 328. The starting block 328 may include the starting block header 326. The starting block 328 may be the first block that comprises a second blockchain segment 330, where the second blockchain segment 330 is a continuation of the blockchain. In embodiments where the first blockchain segment 302 and second blockchain segment 330 may use different formatting rules, the starting block 328 and terminal block 320 and/or starting block header 326 and terminal block header 318 may each be formatted according to the respective formatting rules. In some instances, the blocks 328 and 330 or headers 326 and 318 may each include different data.

Exemplary Method for Generating a Segmented Blockchain

Figure 4:
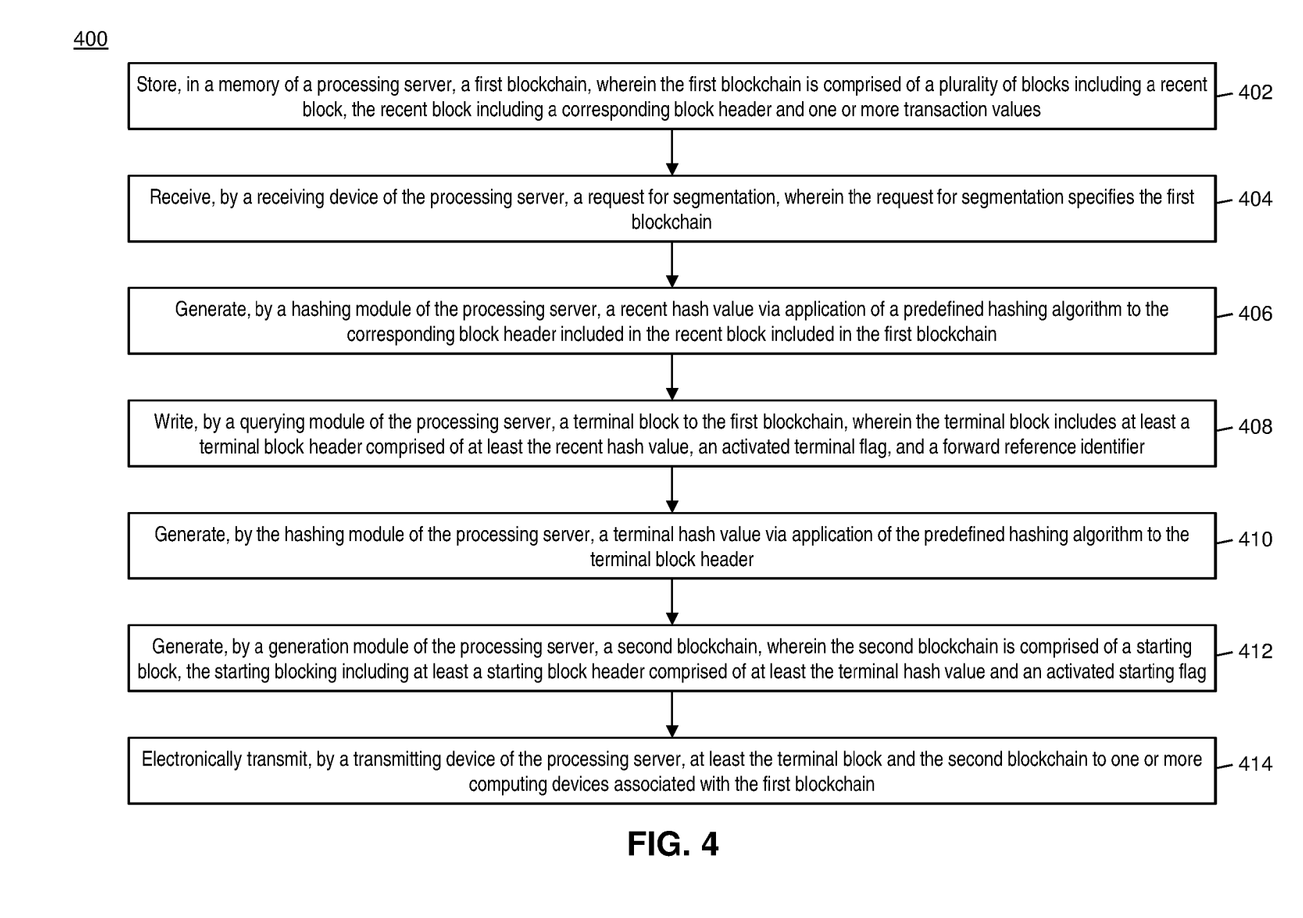
FIG. 4 is a flow chart illustrating an exemplary method for generation of a segmented blockchain in accordance with exemplary embodiments.

FIG. 4 illustrates a method 400 for the generation of a segmented blockchain that enables for the transfer of trust across blockchain segments while enabling the use of different formatting rules in the formatting of the respective blockchain segments.

In step 402, a first blockchain may be stored in a memory (e.g., the memory 220) of a processing server (e.g., the processing server 102), wherein the first blockchain is comprised of a plurality of blocks including a recent block, the recent block including a corresponding block header and one or more transaction values. In step 404, a request for segmentation may be received by a receiving device (e.g., the receiving device 202) of the processing server, wherein the request for segmentation specifies the first blockchain.

In step 406, a recent hash value may be generated by a hashing module (e.g., the hashing module 212) of the processing server via application of a predefined hashing algorithm to the corresponding block header included in the recent block included in the first blockchain. In step 408, a terminal block may be written to the first blockchain by a querying module (e.g., the querying module 210) of the processing server, wherein the terminal block includes at least a terminal block header comprised of at least the recent hash value, an activated terminal flag, and a forward reference identifier. In step 410, a terminal hash value may be generated by the hashing module of the processing server via application of the predefined hashing algorithm to the terminal block header.

In step 412, a second blockchain may be generated by a generation module (e.g., the generation module 214) of the processing server, wherein the second blockchain is comprised of a starting block, the starting blocking including at least a starting block header comprised of at least the terminal hash value and an activated starting flag. In step 414, at least the terminal block and the second blockchain may be electronically transmitted by a transmitting device (e.g., the transmitting device 216) of the processing server to one or more computing devices (e.g., computing devices 106) associated with the first blockchain.

In one embodiment, the starting block header may further include the forward reference identifier. In some embodiments, the terminal block header may further include a deactivated starting flag, and the starting block header may further include a deactivated terminal flag. In a further embodiment, the recent block header may further include a deactivated starting flag and a deactivated terminal flag. In one embodiment, the first blockchain may be associated with a first block size, and the second blockchain may be associated with a second block size different from the first block size. In a further embodiment, the request for segmentation may further include the second block size.

In some embodiments, the terminal block may further include one or more transaction values, the terminal block header may further include a merkle root of the one or more transaction values included in the terminal block, the starting block may further include one or more transaction values, and the starting block header may further include a merkle root of the one or more transaction values included in the starting block. In a further embodiment, the method 400 may also include: generating, by the hashing module of the processing server, the merkle root included in terminal block header via application of a predetermined hashing algorithm to the one or more transaction values included in the terminal block; and generating, by the hashing module of the processing server, the merkle root included in the starting block header via application of the predetermined hashing algorithm to the one or more transaction values included in the starting block.

In one embodiment, the method 400 may further include: storing, in the memory of the processing server, a private key of a key pair; signing, by a signing module (e.g., the signing module 218) of the processing server, the terminal block using the private key prior to writing to the first blockchain; and signing, by the signing module of the processing server, the starting block using the private key during generation of the second blockchain. In a further embodiment, the method 400 may even further include generating, by the generation module of the processing server, the key pair comprising the private key and a corresponding public key.

Computer System Architecture

Figure 5:
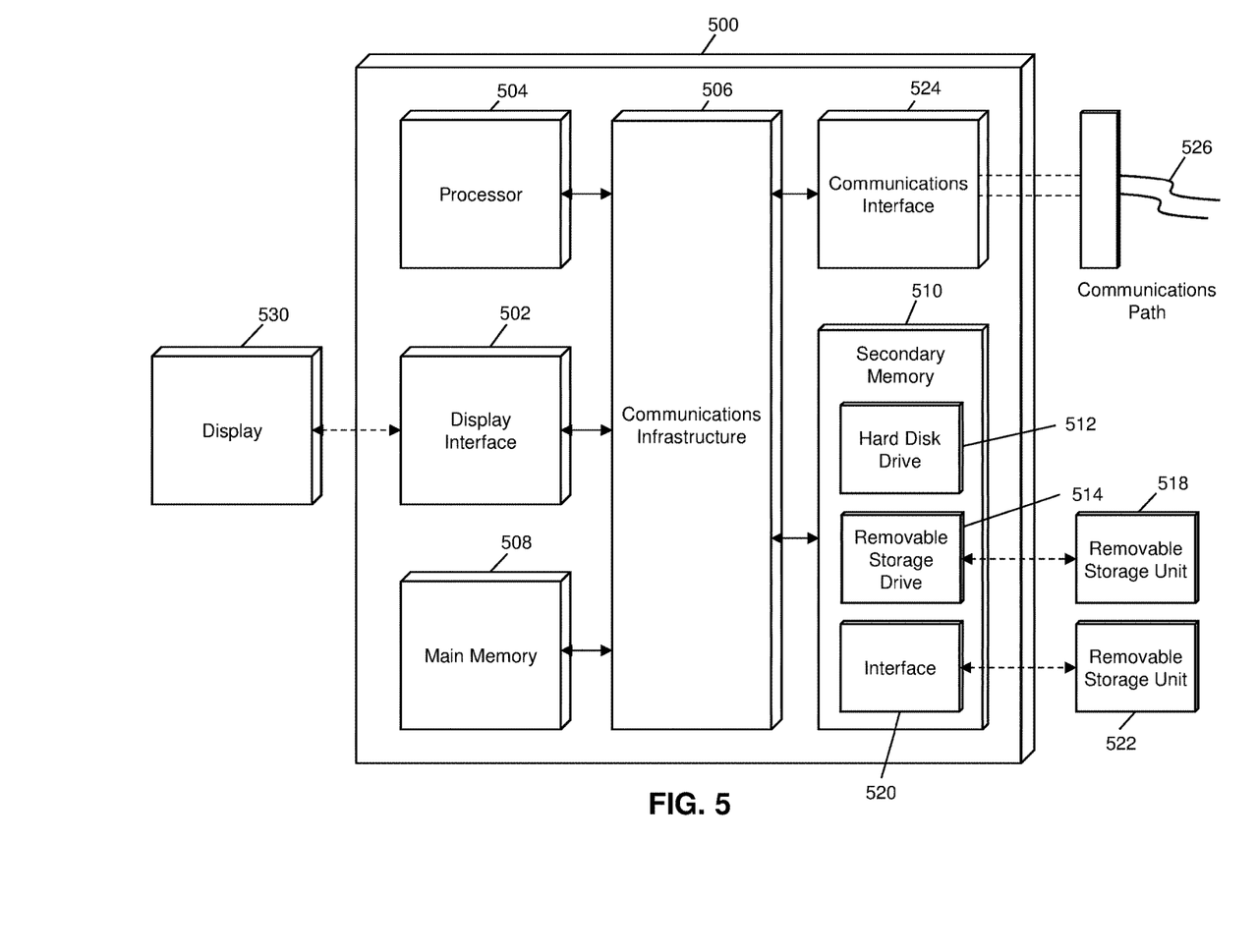
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for generation of segmented blockchains. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for generating a segmented blockchain, comprising:
   storing, in a memory of a processing server, a blockchain, wherein the blockchain includes a plurality of blocks comprising a first segment including a recent block, the recent block including a corresponding block header and one or more transaction values;
   receiving, by a receiving device of the processing server, a request for segmentation, wherein the request for segmentation specifies the first segment;
   generating, by a hashing module of the processing server, a recent hash value via application of a predefined hashing algorithm to the corresponding block header included in the recent block included in the blockchain;
   writing, by a querying module of the processing server, a terminal block to the first segment, wherein the terminal block includes at least a terminal block header comprised of at least the recent hash value, an activated terminal flag, and a forward reference identifier;
   generating, by the hashing module of the processing server, a terminal hash value via application of the predefined hashing algorithm to the terminal block header;
   generating, by a generation module of the processing server, a second segment of the blockchain, wherein the second segment is comprised of a starting block, the starting block including at least a starting block header comprised of at least the terminal hash value and an activated starting flag; and
   electronically transmitting, by a transmitting device of the processing server, at least the terminal block and the second segment to one or more computing devices associated with the first blockchain, wherein
   each transaction value included in the plurality of blocks comprising the first segment are formatted according to a first set of formatting rules, and each transaction value included in blocks in the second segment are formatted according to a second set of formatting rules.

2. The method of claim 1, wherein the starting block header further includes the forward reference identifier.

3. The method of claim 1, wherein
   the terminal block header further includes a deactivated starting flag, and
   the starting block header further includes a deactivated terminal flag.

4. The method of claim 3, wherein the recent block header further includes a deactivated starting flag and a deactivated terminal flag.

5. The method of claim 1, wherein
   the terminal block further includes one or more transaction values,
   the terminal block header further includes a merkle root of the one or more transaction values included in the terminal block,
   the starting block further includes one or more transaction values, and
   the starting block header further includes a merkle root of the one or more transaction values included in the starting block.

6. The method of claim 5, further comprising:
   generating, by the hashing module of the processing server, the merkle root included in terminal block header via application of a predetermined hashing algorithm to the one or more transaction values included in the terminal block; and
   generating, by the hashing module of the processing server, the merkle root included in the starting block header via application of the predetermined hashing algorithm to the one or more transaction values included in the starting block.

7. The method of claim 1, wherein
   the first segment is associated with a first block size, and
   the second segment is associated with a second block size different from the first block size.

8. The method of claim 7, wherein the request for segmentation further includes the second block size.

9. The method of claim 1, further comprising:
   storing, in the memory of the processing server, a private key of a key pair;
   signing, by a signing module of the processing server, the terminal block using the private key prior to writing to the first blockchain; and
   signing, by the signing module of the processing server, the starting block using the private key during generation of the second blockchain.

10. The method of claim 9, further comprising:
    generating, by the generation module of the processing server, the key pair comprising the private key and a corresponding public key.

11. A system for generating a segmented blockchain, comprising:
    a generation module of a processing server;
    a transmitting device of the processing server;
    a memory of the processing server configured to store a blockchain, wherein the blockchain includes a plurality of blocks comprising a first segment including a recent block, the recent block including a corresponding block header and one or more transaction values;
    a receiving device of the processing server configured to receive a request for segmentation, wherein the request for segmentation specifies the first segment;
    a hashing module of the processing server configured to generate a recent hash value via application of a predefined hashing algorithm to the corresponding block header included in the recent block included in the blockchain; and
    a querying module of the processing server configured to write a terminal block to the first segment, wherein the terminal block includes at least a terminal block header comprised of at least the recent hash value, an activated terminal flag, and a forward reference identifier, wherein the hashing module of the processing server is further configured to generate a terminal hash value via application of the predefined hashing algorithm to the terminal block header;

the generation module of the processing server is configured to generate a second segment, wherein the second segment is comprised of a starting block, the starting block including at least a starting block header comprised of at least the terminal hash value and an activated starting flag, and the transmitting device of the processing server is configured to electronically transmit at least the terminal block and the second segment to one or more computing devices associated with the first blockchain, wherein each transaction value included in the plurality of blocks comprising the first segment are formatted according to a first set of formatting rules, and each transaction value included in blocks in the second segment are formatted according to a second set of formatting rules.

12. The system of claim 11, wherein the starting block header further includes the forward reference identifier.

13. The system of claim 11, wherein the terminal block header further includes a deactivated starting flag, and the starting block header further includes a deactivated terminal flag.

14. The system of claim 13, wherein the recent block header further includes a deactivated starting flag and a deactivated terminal flag.

15. The system of claim 11, wherein the terminal block further includes one or more transaction values, the terminal block header further includes a merkle root of the one or more transaction values included in the terminal block, the starting block further includes one or more transaction values, and the starting block header further includes a merkle root of the one or more transaction values included in the starting block.

16. The system of claim 15, wherein the hashing module of the processing server is further configured to generate the merkle root included in terminal block header via application of a predetermined hashing algorithm to the one or more transaction values included in the terminal block, and the merkle root included in the starting block header via application of the predetermined hashing algorithm to the one or more transaction values included in the starting block.

17. The system of claim 11, wherein the first segment is associated with a first block size, and the second segment is associated with a second block size different from the first block size.

18. The system of claim 17, wherein the request for segmentation further includes the second block size.

19. The system of claim 11, further comprising:

a signing module of the processing server, wherein the memory of the processing server is further configured to store a private key of a key pair, and the signing module of the processing server is configured to sign the terminal block using the private key prior to writing to the first blockchain, and the starting block using the private key during generation of the second blockchain.

20. The system of claim 19, wherein the generation module of the processing server is further configured to generate the key pair comprising the private key and a corresponding public key.

* * * * *